Patented July 23, 1935

2,008,680

UNITED STATES PATENT OFFICE 2,008,680

STABILIZATION OF HALOGENATED HYDROCARBONS

Paul Johnson Carlisle and Charles Roberts Harris, Niagara Falls, N. Y., assignors, by mesne assignments, to E. I. du Pont de Nemours and Company, a corporation of Delaware No Drawing. Application March 3, 1931, Serial No. 519,896

8 Claims. (Cl. 23—250)

This invention relates to the stabilization of certain chlorinated hydrocarbons and more particularly to stabilization of the specific compounds, trichlorethylene, tetrachlorethane, or methylene chloride, which tend to undergo decomposition during storage with the formation of substances of acid character. This decomposition makes the product objectionable for such purposes as extraction and the presence of acid causes corrosion in storage tanks. While this type of decomposition is more or less general in all chlorinated hydrocarbons we have found that "anti" catalysts or addition materials satisfactory for stabilization of one compound are not necessarily satisfactory for all others.

Such varied substances as xylene, phenols, toluene, resorcinol, guaiacol, thymol, methanol and carbon tetrachloride, have been proposed as stabilizers for chloroform. We have found that these materials are not of general applicability to all chlorinated hydrocarbons but that the action of the inhibitors is specific in effect and of a catalytic nature. Some of these substances are very poor stabilizers for certain chlor-hydrocarbons, and must be used in large amounts. Such amounts of stabilizer render the chlorinated hydrocarbon useless, for example in certain extractions; poor stabilization results in acidity.

Hydrocarbons, for instance gasoline, have been proposed as stabilizers for trichlorethylene. These are objectionable when the solvent is used in certain processes because a comparatively large amount of gasoline is required to stabilize and the hydrocarbon "heavy ends" may be deposited in and contaminate the product.

We have now found that the development of an objectionable degree of acidity in the chlorhydrocarbons listed above, may be prevented by the addition of phenolic substances. Furthermore, the amount of phenolic substance required is in general so small that its presence is not objectionable, even for processes requiring a solvent of high purity.

The process of stabilization consists in mixing a small amount, for instance 0.0001–0.1%, of the phenolic substance with the product to be stabilized. A preferred method of mixing consists in transferring the required amount of a strong stock solution of the stabilizer, made by mixing an exact amount of the stabilizer and a definite amount of the product it is desired to stabilize into a known volume of the chlorinated hydrocarbon. Other methods, according to the specific problem that might be involved, will readily suggest themselves to one skilled in handling such substances.

This invention is not limited to specific proportions of stabilizer. As low as 0.0001 percent by weight of a phenol, is usually quite markedly effective, other purposes may demand as high as about 1%, according to the specific situation. The amount added will depend on the specific stabilizing agent, the particular compound to be stabilized, the problem of its use, and degree of stability desired.

To measure the instability of a chlorinated hydrocarbon, we have determined the acidity developed over various periods of time.

Example

A number of chlorinated hydrocarbons were stabilized with small concentrations of phenolic substances. The results are given in the following table for comparison, the behavior of the unstabilized product is also cited. The acidity is stated in terms of the number of cubic centimeters of 0.01 normal sodium hydroxide solution required to neutralize 25 cc. of the chlorinated hydrocarbon using phenolphthalein as indicator:

| Chlorinated hydrocarbon | Stabilizer | Concentration or range conc. of stabilizer | Initial acidity | Days | Maximum final acidity |
|---|---|---|---|---|---|
| Tetrachlorethane | None | None | 0.2 | 164 | 500 |
| Do | p-cresol | 0.001% | 0.2 | 164 | 0.2 |
| Do | Hydroquinone | 0.001 | 0.2 | 69 | 31 |
| Do | Catechol | 0.001 | 0.2 | 164 | 192.5 |
| Trichlorethylene | None | None | 0.3 | 3 | 28 |
| Do | Resorcinol | 0.0001–0.05 | 0.3 | 120 | 3 |
| Do | Thymol | 0.0001–0.05 | 0.3 | 120 | 1.1 |
| Do | Phenol | 0.05–0.1 | 0.3 | 90 | 1 |
| Do | Hydroquinone | 0.001 | 0.2 | 14 | 3 |
| Do | α-naphthol | 0.05 | 0.3 | 120 | 3 |
| Do | Pyrogallol | 0.05 | 0.3 | 30 | 3 |
| Do | o-amino phenol | 0.05 | 0.3 | 21 | 3 |
| Methylene chloride | None | None | 0.2 | 92 | 280 |
| Do | Catechol | 0.01 | 0.2 | 92 | 2 |
| Do | Thymol | 0.01 | 0.2 | 135 | 0.50 |
| Do | Hydroquinone | 0.001 | 0.40 | 22 | 0.60 |
| Perchlorethylene | None | None | 0.2 | 56 | 150 |
| Do | Thymol | 0.001 | 0.2 | 55 | 0.35 |
| Do | Phenol | 0.001 | 0.2 | 55 | 0.35 |
| Dichlorethylene | None | None | 0 | 53 | 33 |
| Do | Phenol | 0.001 | | 53 | 0.01 |
| Do | Thymol | 0.001 | | 53 | 0.01 |

The above table also shows, by the results with hydroquinone for example, that the stabilizing action is not predictable from any knowledge of a group of stabilizers or of compounds to be stabilized. By comparison it may be seen that there is a divergence of behavior with various of the stabilizers; and one member of the group of chlorinated hydrocarbons may show different stability when grouped with individual phenols, the difference is usually one of degree of positive action.

Many compounds have been tried. We have found hydroquinone, p-cresol, phenol, resorcinol, thymol, α-naphthol, pyrogallol, o-amino phenol, and catechol are particularly valuable as stabilizers for these chlorinated hydrocarbons.

We claim:—

1. A composition of matter comprising a chlorinated hydrocarbon of the group comprising trichlorethylene, tetrachlorethane, and methylene chloride and 0.05% by weight of a phenol of the group consisting of hydroquinone, p-cresol, phenol, resorcinol, thymol, α-naphthol, pyrogallol, o-amino phenol, and catechol.

2. A composition of matter comprising trichlorethylene and 0.05% by weight of a phenol of the group consisting of hydroquinone, p-cresol, phenol, resorcinol, thymol, α-naphthol, pyrogallol, o-amino phenol and catechol.

3. A composition of matter comprising tetrachlorethane and 0.05% by weight of a phenol of the group consisting of hydroquinone, p-cresol, phenol, resorcinol, thymol and catechol.

4. A composition of matter comprising methylene chloride and 0.05% by weight of a phenol of the group consisting of hydroquinone, phenol, thymol, and catechol.

5. A composition of matter comprising trichlorethylene and from about 0.0001% to about 1% by weight of a phenol of the group consisting of hydroquinone, p-cresol, phenol, resorcinol, thymol, α-naphthol, pyrogallol, o-amino phenol and catechol.

6. A composition of matter comprising tetrachlorethane and from about 0.0001% to about 1% by weight of a phenol of the group consisting of hydroquinone, p-cresol, phenol, resorcinol, thymol, and catechol.

7. A composition of matter comprising methylene chloride and from about 0.0001% to about 1% by weight of a phenol of the group consisting of hydroquinone, phenol, thymol and catechol.

8. A composition of matter comprising a chlorinated hydrocarbon of the group which consists of dichlorethylene, trichlorethylene, perchlorethylene, tetrachlorethane and methylene chloride and 0.05% by weight of a phenol of the group consisting of hydroquinone, p-cresol, phenol, resorcinal, thymol, α-naphthol, pyrogallol, o-amino phenol and catechol.

PAUL JOHNSON CARLISLE.
CHARLES ROBERTS HARRIS.